United States Patent Office 3,144,596
Patented Aug. 11, 1964

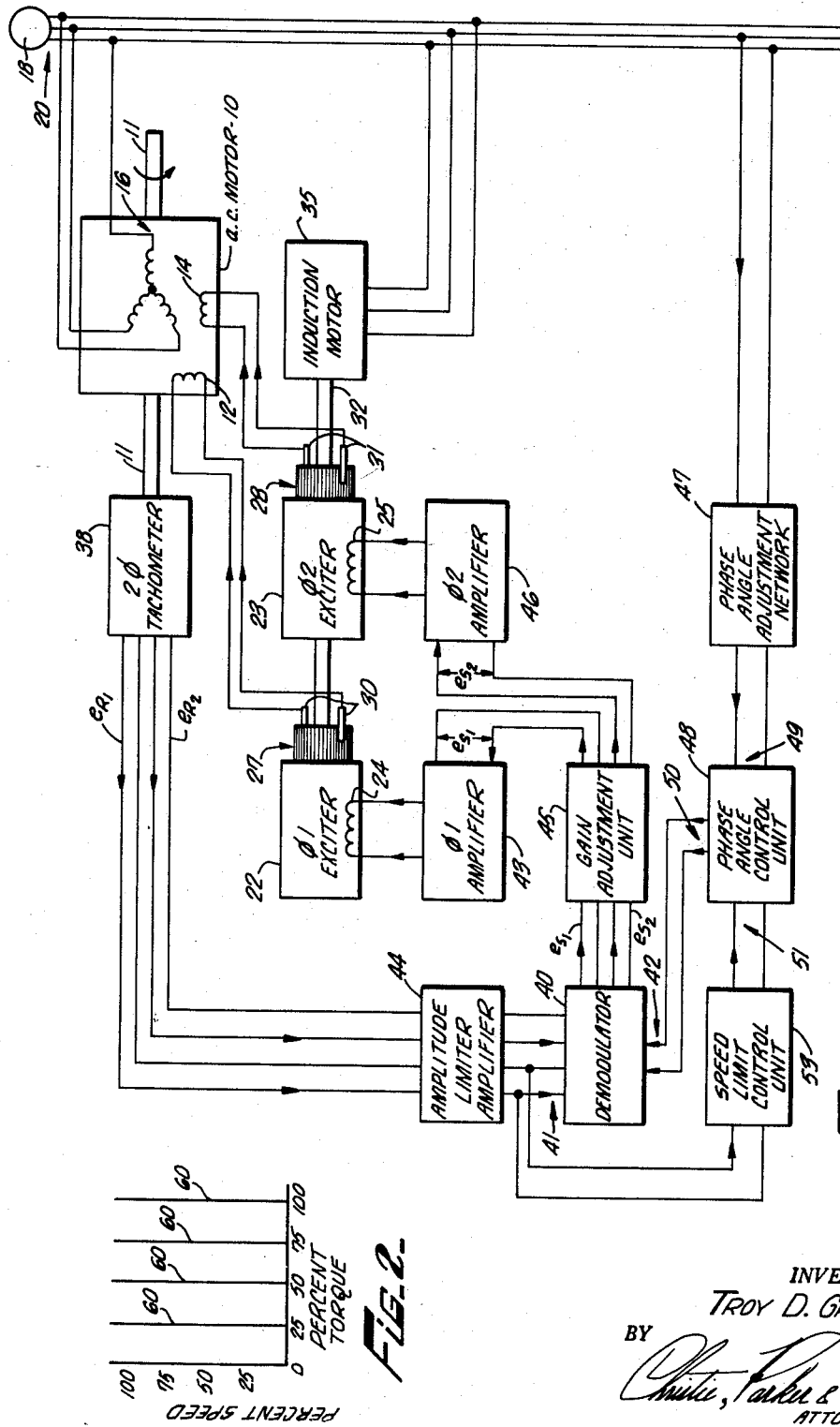

3,144,596
CONTROL APPARATUS FOR ALTERNATING
CURRENT DYNAMOELECTRIC MOTORS
Troy D. Graybeal, Anaheim, Calif., assignor to Lear Siegler, Inc., a corporation of Delaware
Filed Feb. 27, 1961, Ser. No. 91,924
11 Claims. (Cl. 318—197)

The present invention relates to apparatus for controlling alternating current dynamoelectric motors and more particularly to an apparatus for controlling the torque produced by such motors independently of speed.

Control systems for alternating current (A.C.) dynamoelectric machines are known in which the shaft speed is controlled by applying A.C. excitation to the field windings to control the direction and speed of rotation of the shaft. In such systems, the speed of the rotating magnetic flux set up by the rotor is made up of two components: (1) the direction and speed of the mechanical rotation of the field windings relative to the armature and, (2) the phase and frequency of the A.C. voltage applied to the field windings. The sum of these two components must at all times be equal to the speed of the magnetic field set up by the stator for the machine to develop torque effectively. The A.C. machines utilized with such systems are generally constructed with a non-salient pole field and armature structure.

The field excitation voltage or current applied to controlled flux A.C. excited induction machines has a frequency equal to the difference between the frequency of the current in the stator and the rotational frequency of the machine. The rotational frequency of the machine is equal to the speed of rotation of the rotor in revolutions per second, times the number of pairs of poles for which the machine is wound. The difference between the frequency of the current in the armature or stator and the rotational frequency is generally referred to as the slip frequency because it is always equal to the armature frequency times the slip, where the slip is expressed as a per unit value and is equal to the difference between the synchronous speed and the actual speed divided by the synchronous speed. Apparatus for providing A.C. excitation at slip frequency is disclosed in the following copending applications of Troy D. Graybeal and Charles Philip Cardeiro, which are assigned to the assignee of the present invention. (1) "Control Apparatus for Alternating Current Dynamoelectric Machines," Serial No. 81,389, filed January 9, 1961, and (2) "Control Apparatus for Alternating Current Dynamoelectric Machines," Serial No. 91,925, filed February 27, 1961. The present invention relates to an apparatus for controlling the A.C. excitation to an induction machine to provide an accurate torque controlled motor of high efficiency.

Torque controlled motors have many uses in industry. Such motors are particularly useful where an automatic control of the torque is desired, i.e., in tension control drives, servo motor and traction motor applications. A motor having a constant torque characteristic (as distinguished from a constant speed characteristic) is highly desired for many types of service but is not easily obtained with conventional motors. A constant torque characteristic has generally been achieved by employing a direct current (D.C.) motor and a complex control system such as a D.C. shunt motor with armature resistance and/or voltage control for supplying the armature current for the motor or by means of a metadyne system. Conventional alternating current motors can be controlled to provide only an approximate constant or controlled torque characteristic and in such cases the motors operate at a very poor power factor or efficiency. The above disadvantages of conventional prior art apparatus for providing controlled torque drives are overcome by the present invention.

In accordance with the present invention, an apparatus is provided for accurately controlling the torque developed by an alternating current motor having a polyphase field winding and an armature. A source of alternating current energizing potential is connected to the armature of the motor and amplifying exciting means having a polyphase signal input circuit, a polyphase power output circuit are provided for supplying field excitation power to the motor. The power output circuit is connected to the field windings of the motor. Power transfer means operable independently of the torque developed by the motor are provided to selectively supply and receive power from the exciting means. Preferably a polyphase rotating exciter (amplifying exciting means) driven by a separate prime mover (power transfer means) is employed to supply the field excitation power to the motor. Control means responsive to the frequency of the alternating current energizing potential and to the speed of the motor are provided for producing a polyphase regulating signal of slip frequency. Additional means are provided for applying the polyphase regulating signal to the signal input circuit of the exciting means.

The magnitude of the torque developed by the alternating current motor varies with the space phase angle between the stator magnetic flux set by the armature current and the rotor magnetic flux set up by the field excitation current. The magnitude of this torque as applied to the shaft of the motor may be controlled by controlling the phase angle between the stator and rotor component magnetic fluxes or by controlling the time phase relationship of the field excitation current to the motor with respect to the armature current where the source of the field excitation power (such as the amplifying exciting and power transfer means) is independent of the torque developed by the motor. If desired means may be included for adjusting the time phase relationship of the polyphase regulating signals to permit the torque developed by the motor to be readily changed or controlled independently of its speed.

The invention is described in more detail in reference to the accompanying drawings in which:

FIG. 1 is a block diagram of an apparatus constructed in accordance with the present invention; and FIG. 2 is a graph illustrating the speed torque characteristics of the motor of the apparatus of FIG. 1.

Referring now to FIG. 1, there is illustrated an A.C. dynamoelectric or induction motor 10 with two phase displaced field windings 12 and 14 and a three phase armature winding 16 connected to a three phase source of energizing potential 18 through a transmission line 20. The source of energizing potential 18 may be a conventional alternator. The field windings 12 and 14 of the motor 10 may be wound on the rotor and connected to conventional slip rings (not shown) for external excitation as will be more fully explained. The A.C. motor 10 includes a shaft 11 which may be connected to a suitable load (not shown). Amplifying or rotating exciting means in the form of a pair of single phase exciters 22 and 23 are provided for supplying the excitation to the field windings of the motor 10. The exciters 22 and 23 are similar to conventional D.C. machines and are provided with single phase field windings 24 and 25, respectively. The exciters 22 and 23 are also provided with armature windings (not shown) which are connected to commutators 27 and 28, respectively. The commutators 27 and 28 function as phase sensitive demodulators and include stationary brushes 30 and 31, respectively, which are connected to the field windings 12 and 14 of the A.C. motor 10. The commutator bars of the commutators 27 and 28 are secured to a common shaft 32 which is connected to the rotors of the exciters 22 and 23 and is driven by a suitable prime mover such as a constant speed motor 35 in the form of a squirrel cage induction motor. The induction motor 35 is supplied with power from the transmission line 20 as shown and thus supplies power to the exciting means independently of the torque developed by the motor 10. The field windings 24 and 25 form the polyphase input circuit for the exciting means and the brushes 30 and 31 form the polyphase output circuit for the exciting means.

Control means including a speed measuring device such as a tachometer 38 and a phase sensitive demodulator or frequency comparator 40 are provided for producing polyphase regulating signals of slip frequency which are applied to the field windings of exciters 22 and 23 as will be more fully described. The tachometer 38 is connected to the shaft 11 of the A.C. motor 10 and provides two 90° phase displaced output signals $e_{R1}$ and $e_{R2}$ which are applied to one input circuit 41 of the demodulator 40 through an amplitude limiter amplifier 44. The amplifier 44 limits the amplitude of the signals derived from the tachometer 38 to prevent changes in speed of the tachometer from changing the amplitude of the field excitation of the motor 10 and preferably to provide a square wave input signal to the demodulator 40.

The demodulator 40 has another input circuit 42 which is supplied with a single phase alternating current voltage from the alternating current energizing source 18 through a phase angle adjustment network 47 and a phase angle control unit 48. The demodulator 40 serves to obtain the algebraic difference between the A.C. signals applied to the two input circuits in a well known manner and provides a polyphase output in the form of two 90° phase displaced regulating signals $e_{S1}$ and $e_{S2}$. The regulating signals have a frequency equal to the difference between the frequencies of the output signals from the tachometer 38 and the source of energizing potential 18. Since the tachometer 38 produces a signal having a frequency representative of the speed of rotation of the A.C. motor 10, the regulating signals $e_{S1}$ and $e_{S2}$ have a frequency representative (or in this case equal to) the slip frequency of the A.C. motor 10.

The polyphase regulating signals $e_{S1}$ and $e_{S2}$ are applied to a pair of power amplifiers 43 and 46 through a gain adjustment network 45. The amplifiers 43 and 46 are connected to the field windings 24 and 25 of the exciters 22 and 23 respectively for applying the amplified polyphase regulating signals thereto. The exciters 22 and 23 amplify the polyphase regulating signals and provide double side band suppressed carrier signals in the armature windings thereof which are demodulated in the commutators 27 and 28 so that the excitation signals applied to the field windings 12 and 14 of the A.C. motor 10 have a frequency equal to the frequency of the polyphase regulating signals which is the slip frequency of the motor 10. The gain adjustment unit 45 may be connected in the input circuit 42 of the demodulator 40 if desired. The gain adjustment unit 45 serves to control the amplitude of the polyphase regulating signals and thus controls the power factor at which the motor 10 operates.

The phase angle adjustment network 47 controls the time phase relationship between the input and output A.C. signals in accordance with a manual adjustment (not shown) or an electrical signal as is well known in the art. Thus the phase angle adjustment nework 47 controls the time phase relationship of the regulating signals $e_{S1}$ and $e_{S2}$ which in turn control the torque developed by the A.C. motor 10. The phase angle control unit 48 also controls the time phase relationship of the A.C. signals between the input circuit 49 and the output circuit 50 thereof in accordance with a control signal applied to the control input circuit 51. A speed limit control unit 53 is connected between the input circuit 51 of the phase angle control unit 48 and one phase of the output circuit of the amplitude limiter amplifier 44 to apply a signal to the control unit 48 when the frequency of the output signals from the tachometer 38 reaches a predetermined maximum.

The phase angle control unit 48 changes the time phase relationship between the A.C. signals on the input and output circuits 49 and 50 when a signal is applied to the control input circuit 51 thereof to reduce the phase angle between the field excitation current and the armature voltage. This decreases the torque developed by the motor 10 and reduces the speed to prevent the motor from over speeding. If desired the phase angle control unit 48 and the phase angle adjustment network 47 may be incorporated into a single unit. It should also be noted that the unit 48 and the network 47 may be inserted in the input circuit 41 of the demodulator 40.

In operation, the torque developed by the motor 10 is determined by the phase angle between the field excitation current applied to the field windings 12 and 14 and the terminal voltage applied to the armature winding 16. Once the phase angle adjustment network 47 has been set to provide a predetermined time phase relationship of the polyphase regulating signals $e_{S1}$ and $e_{S2}$ the torque developed by the A.C. motor 10 remains fixed independently of the speed of the motor. In FIG. 2 the torque vs. speed characteristics of the motor 10 are illustrated by the curves 60 for several different adjustments of the phase angle control network 47. As is illustrated by this figure the torque developed by the motor 10 is independent of the motor speed.

When the A.C. motor 10 is operating below synchronous speed, power flows from the field windings 12 and 14 into the armature windings of the exciters 22 and 23 which operate as motors driving the induction motor 35 as a generator and thus returning power to the transmission line 20. When the motor 10 is operating above synchronous speed, power is supplied from the exciters 22 and 23 to the field windings 12 and 14. Since the exciters 22 and 23 are driven by a prime mover that is independent of the motor 10 the torque developed by the motor 10 and applied to the shaft 11 is not affected by the power transfer in the exciters 22 and 23. The torque developed by the motor 10 and applied to the shaft 11 is affected only by the time phase relationship of the polyphase regulating signals $e_{S1}$ and $e_{S2}$.

To control the operation of the A.C. motor 10 over a wide speed range certain compensation circuits should be added which are described in the copending application discussed above, Serial No. 81,389, filed January 9, 1961.

Various modifications of the apparatus of the present invention will be obvious to those skilled in the art. For example, other means for generating the polyphase regulating signals $e_{S1}$ and $e_{S2}$ may be provided. One such apparatus which employs an auxiliary frequency signal generator is discussed in the copending application also discussed previously, Serial No. 91,925, filed February 27, 1961. It should also be noted that the field windings of the motor 10 and the exciters 22 and 23 may be placed on the rotor or stator structure. Power amplifiers of other types such as electronic (i.e., transistor amplifiers) may be used to supply the excitation power for the field windings of the motor 10 providing that the power transferred by such amplifiers does not affect the torque applied to the shaft 11 by the motor 10.

I claim:

1. In an apparatus for controlling the torque developed by an alternating current motor having a polyphase field winding and an armature the combination which comprises a source of alternating current energizing potential connected to the armature of the alternating current motor, amplifying exciting means having a polyphase input and output circuit for supplying field excitation to the motor, power transfer means for selectively supplying power to and receiving power from the exciting means independently of the torque developed by the motor, means for connecting the output circuit of the exciting means to the field windings of the motor, means responsive to the frequency of the alternating current energizing potential and to the speed of the motor for producing polyphase regulating signals of slip frequency and means for applying the polyphase regulating signals to the input circuit of the exciting means.

2. The combination as defined in claim 1 including means for controlling the time phase relationship of the polyphase regulating signals to control the torque developed by the motor.

3. The combination as defined in claim 2 including means for controlling the amplitude of the polyphase regulating signals to control the power factor at which the motor operates.

4. The combination as defined in claim 3 including means for controlling the time phase relationship of the polyphase regulating signals in response to a predetermined maximum speed of the motor to reduce the torque developed by the motor for preventing excess speeding of the motor.

5. In an apparatus for controlling the torque developed by an alternating current motor having a polyphase field winding and an armature the combination which comprises a source of alternating current energizing potential connected to the armature of the alternating current motor, rotating exciting means having polyphase field and armature windings for supplying field excitation to the motor, means for providing relative rotation between the field and armature windings of the exciting means, means including demodulating means for connecting the armature windings of the exciting means to the field windings of the motor, means responsive to the frequency of the alternating current energizing potential and to the speed of the motor for producing polyphase regulating signals of slip frequency and means for applying the polyphase regulating signals to the input circuit of the exciting means.

6. In an apparatus for controlling the torque developed by an alternating current motor having a polyphase field winding and an armature the combination which comprises a source of alternating current energizing potential connected to the armature of the motor, dynamoelectric exciting means having polyphase field and armature windings for supplying field excitation to the motor, a prime mover coupled to the exciting means for providing relative rotation between the field and armature windings thereof, means including phase sensitive demodulating means for connecting the armature windings of the exciting means to the field windings of the motor to supply excitation current to the motor having a frequency equal to the frequency of the current applied to the field windings of the exciting means, control means responsive to the frequency of the alternating current energizing potential and to the speed of the motor for producing polyphase regulating signals of slip frequency, means for applying the polyphase regulating signals to the field windings of the exciting means and means for controlling the time phase relationship of the polyphase regulating signals to control the torque developed by the motor independently of the speed of the motor.

7. The combination as defined in claim 6 including means for controlling the amplitude of the polyphase regulating signals to control the power factor at which the motor operates.

8. The combination as defined in claim 6 wherein the demodulating means comprises a polyphase commutator connected to the exciting means for rotation therewith.

9. The combination as defined in claim 8 wherein the prime mover is a constant speed motor connected to the alternating current energizing source.

10. In an apparatus for controlling the torque developed by a first alternating current motor having a two phase field winding and a polyphase armature the combination which comprises a source of polyphase energizing potential connected to the armature of the first motor, first and second single phase rotating exciters, each of the exciters having a field winding and an armature, a second alternating current motor connected to the first and second exciters for providing relative rotation between the field and armature windings thereof, means for connecting the second motor to the source of energizing potential, phase-sensitive demodulating means individually connected between the armature windings of each of the exciters and respective field windings of the first motor, control means responsive to the frequency of the energizing potential and to the speed of the first motor for producing two phase regulating signals having a frequency equal to the slip frequency of the first motor and means for applying the two phase regulating signals to the respective field windings of the first and second exciters.

11. The combination as defined in claim 10 including means for controlling the time phase relationship and the amplitude of the two phase regulating signals to control the power output and operating power factor of the first motor.

References Cited in the file of this patent
UNITED STATES PATENTS

| | | |
|---|---|---|
| 2,344,828 | Longwell et al. | Mar. 21, 1944 |
| 2,660,701 | Pestarini | Nov. 24, 1953 |
| 3,012,185 | Johnson | Dec. 5, 1961 |